May 5, 1964  C. L. SEEFLUTH  3,131,623
METHOD AND APPARATUS FOR MAKING THERMOPLASTIC FILM SEAMS
Filed Oct. 30, 1961  4 Sheets-Sheet 1

INVENTOR.
C.L. SEEFLUTH
BY Young and Quigg
ATTORNEYS

May 5, 1964 C. L. SEEFLUTH 3,131,623
METHOD AND APPARATUS FOR MAKING THERMOPLASTIC FILM SEAMS
Filed Oct. 30, 1961 4 Sheets-Sheet 2

INVENTOR.
C.L. SEEFLUTH
BY Young and Quigg
ATTORNEYS

United States Patent Office 3,131,623
Patented May 5, 1964

3,131,623
METHOD AND APPARATUS FOR MAKING
THERMOPLASTIC FILM SEAMS
Charles L. Seefluth, Bartlesville, Okla., assignor to
Phillips Petroleum Company, a corporation of
Delaware
Filed Oct. 30, 1961, Ser. No. 148,580
4 Claims. (Cl. 100—38)

This invention relates to the sealing of adjacent layers of thermoplastic material. A more specific aspect of the invention is an improvement in the sealing of thermoplastic bags. Another aspect of the invention is concerned with an improved method for making a thermoplastic seam with radiant heat. Still another aspect of the invention is directed to an improved radiant heater for sealing adjacent films of thermoplastic material.

The sealing of thermoplastic bags as well as the formation of seams in adjacent layers of thermoplastic films and sheets has been accomplished in the past by contacting the thermoplastic with a heated surface such as a smooth metal surface. This method is attended by numerous disadvantages, including sticking of the thermoplastic to the metal surface, charring of the material, and an unsatisfactory consumption of time in effecting a satisfactory seal or seam. The use of radiant heat has heretofore been proposed; however, a prohibitive amount of electrical current has been required if the heat source is safely spaced from the work.

It is therefore an object of this invention to provide a method and means for producing a seam or seal at the adjacent edges of layers of thermoplastic films or sheets utilizing radiant heat. It is an object of this invention to provide a radiant heater which will subject the work to 180° of radiation at a relatively small expenditure of electrical energy. A further object of the invention is to provide a method for decreasing the time consumed in making a seam or seal of layers of thermoplastic films. Still another object of the invention is to provide an improved method and means for sealing thermoplastic bags by radiant heat. Other and further objects and advantages will be apparent to one skilled in the art upon study of the detailed description of the invention including the drawing wherein:

Broadly the invention contemplates the fusing of two adjacent layers of thermoplastic film by subjecting the edge portions of the films to 180° of radiant heat. This is accomplished by passing the work within the arc of a radiant heater formed by a heating element comprising a thin, flat resistance ribbon formed into a plurality of reverse turns and deformed into a concave surface which can be defined as a sector of a hollow right circular cylinder wherein the arc of the sector is from about 130° to 180°. The invention will be described as applied to the sealing of thermoplastic bags but is applicable to forming a seam or seal between any adjacent layers of thermoplastic film or sheet.

Figure 1:
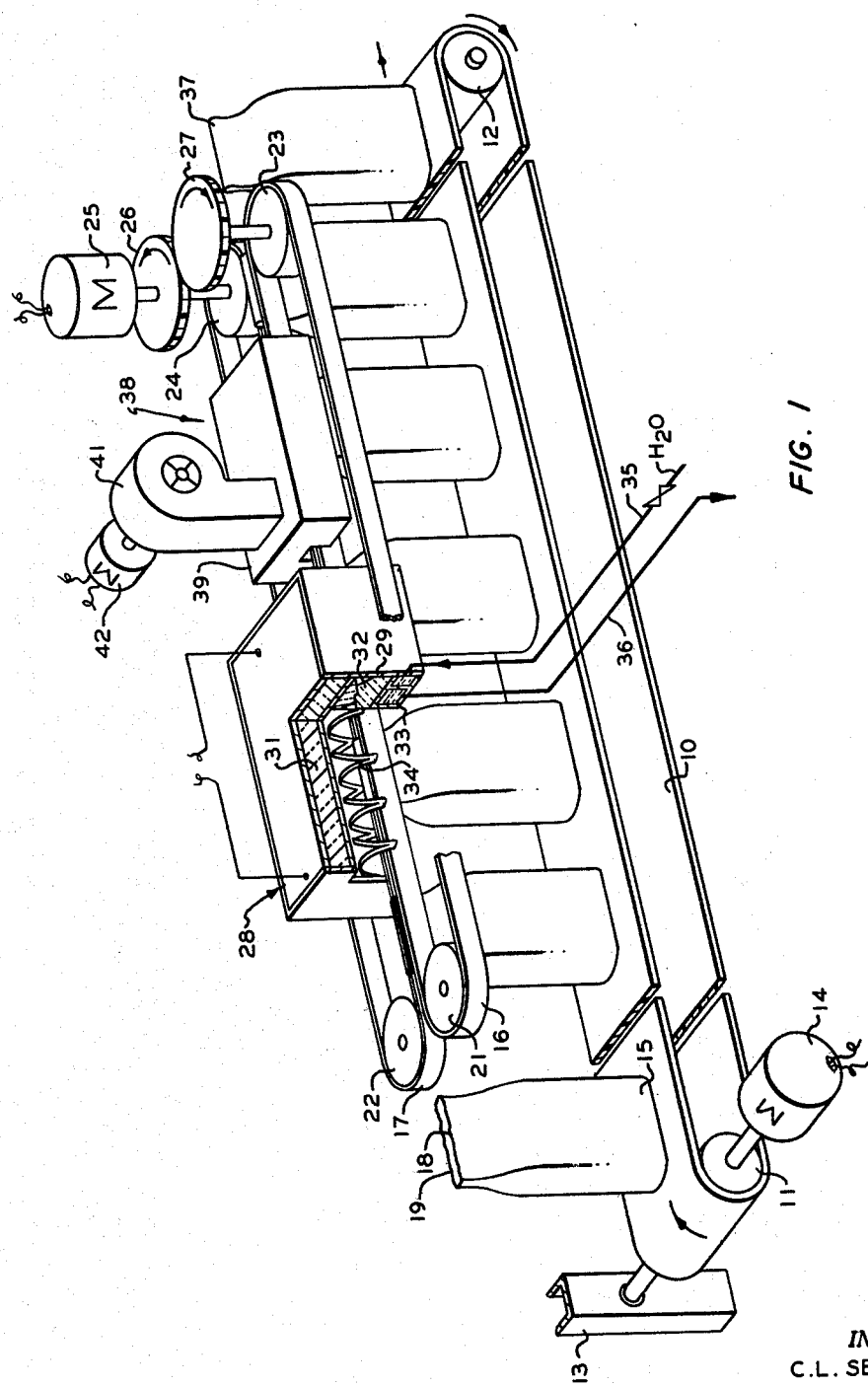
FIGURE 1 is a schematic illustration of a bag sealer having incorporated therein the heating element of the invention.

Referring now to FIGURE 1 which illustrates a suitable mechanism for carrying out the method of the invention, a conveyor belt 10 is mounted on rollers 11 and 12 which are supported on a suitable frame indicated at 13. The conveyor belt 10 is actuated by suitable means such as motor 14. Bags 15 are carried by the conveyor belt so that the open tops thereof are engaged by opposing metal belts 16 and 17 so that the upper edges of the bag walls 18 and 19 are pressed together. The tops of the bags can be tucked or sealed flat as shown, i.e., with the walls of the bag together from side to side. Endless belts 16 and 17 are carried on pulleys 21, 22, 23 and 24 supported on frame 13 by conventional means (not shown) and actuated by motor 25 and gears 26 and 27. The conveyor 10 and the endless belts 16 and 17 carry the bags, with the tops pressed together, through the heating means 28.

The heating means 28, shown in greater detail in FIGURES 2 to 6, is comprised of a case 29, insulation 31, ceramic blocks 32, belt cooling means 33, and heating elements 34. Cooling fluid such as water is conveyed to and from the belt cooling means 33 by conduits 35 and 36.

The bags are passed from the heating means 28 to the cooling means 38 where the bead 37, which forms the seam at the top of the bag, is cooled. The cooling means comprises a case 39 in the form of an open box to direct a blast of air from blower 41 onto the bead 37. Motor 42 operates blower 41.

A source of electrical power (not shown) supplies electrical energy to heater element 34 and to motors 14, 25 and 42.

Figure 2:
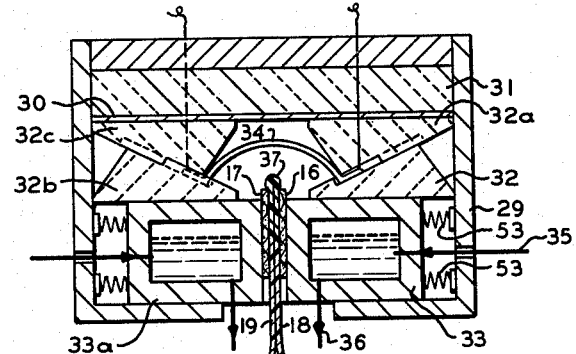
FIGURE 2 is a cross-sectional view of the heater of the invention.
Figure 3:
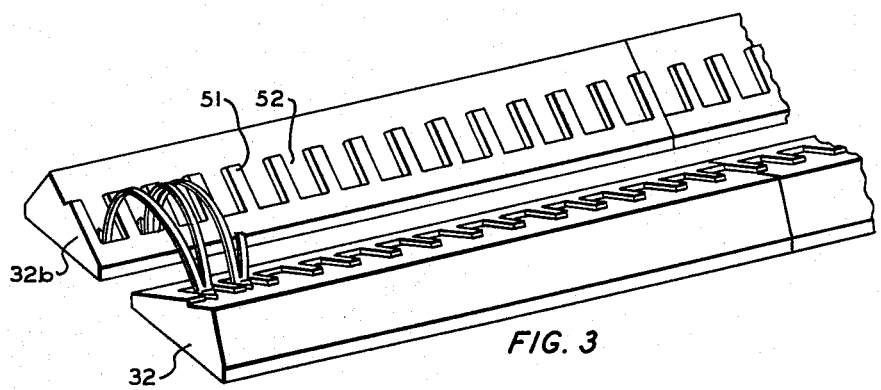
FIGURE 3 illustrates one means for positioning the heating element.
Figure 4:
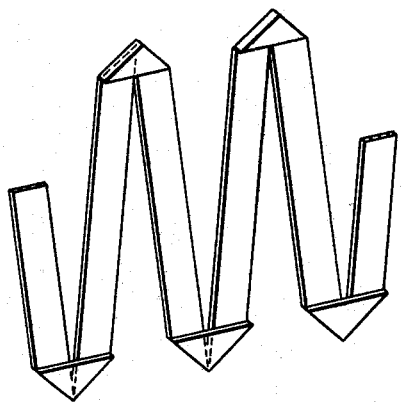
FIGURE 4 illustrates a method for constructing the heating element.

Heating means 28 is shown in FIGURES 2, 3 and 4. The ceramic blocks 32, 32a, 32b and 32c are substantially identical and are generally triangular in shape as shown in FIGURE 3, having a series of raised sections to form a series of lands 51 and grooves 52. The heating element 34 is shown in FIGURE 4 as being fabricated by folding a flat Nichrome ribbon upon itself to form a length of resistance element of substantially rectangular configuration. The ribbon is then bent at the folds to form tabs to rest in the grooves 52 of the blocks 32 and 32b. The block 32a is then placed on block 32 inverted and reversed so that the top and bottom of the blocks are substantially parallel and the block 32a bears against the heating element 34 to secure the heating element in concave relationship with the edge portions of the sides 18 and 19 of bag 15. The concave heating element has the configuration of a sector of a hollow right circular cylinder and the arc of the sector is preferably about 180° so that the film edges to be fused can be substantially equidistant from all points of the heating surface. The arc formed by the heating element can be less than 180° and can be about 130° as long as the edges of the film to be fused are within the arc so as to be subjected to 180° of radiant heat. The arc formed by the heating element 34 can be varied in the embodiment shown in FIGURE 2 by varying the distance between the blocks 32 and 32b, e.g. by placing shims between the blocks and the case 29 or by varying the length of resistance element between turns.

The endless belts 16 and 17 are preferably made of metal for rapid heat conductance and are maintained in contact with the opposing surfaces of cooling means 33 and 33a while under the influence of the radiant heating element 34. The cooling means can advantageously be comprised of a hollow rectangular vessel with cooling fluid inlet and outlet means as indicated by conduits 35 and 36 slidably positioned in case 29 and urged into contact with the belts 16 and 17 by coil springs 53 or other resilient means.

Figure 6:
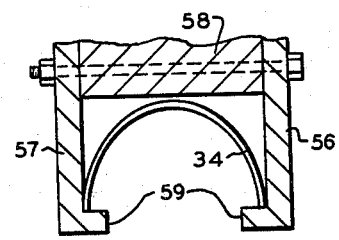
FIGURE 6 illustrates still another means for positioning the heating element.
Figure 5:
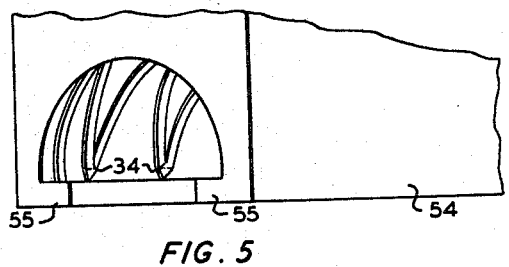
FIGURE 5 illustrates another means for positioning the heating element.

Alternate means for securing the heater element are shown in FIGURES 5 and 6. The heater block can be a solid block 54 milled as shown in FIGURE 5 so that the folded heating element 34 can be snapped into the concave surface of the block so that the shoulders 55 retain the turns of the heating element.

A somewhat similar means is shown in FIGURE 6 wherein members 56 and 57 are secured to member 58 by cementing or by bolting. The shoulders 59 retain the heating element in position.

The maximum available radiant heat can be obtained in the method and means of my invention by utilizing a flat, thin resistance element fabricated into a plurality of turns. The element can be made by folding a resistance ribbon into reverse turns as shown or it can be die cut or stamped from a sheet of metal or molded in the desired form. I have found that the ends of 50-pound thermoplastic tubular bags can be satisfactorily sealed with an 18-inch concave radiant heating element (180° arc) made by folding a 200-inch length of 0.093 inch by 0.0045 inch Nichrome V as shown in FIGURE 4. The conditions were 240 volts, 7 amps. and 1680 watts to provide a temperature of 2000° F. A satisfactory seal was obtained in less than 1 second with a space of about 1/4 inch between the heating element and the film edges. No spacing means is required between the segments of the heating element and substantially no effectiveness is lost if adjacent segments touch because the radiant heat received by the film edges is uniform even though the radiant surface is not continuous. A stainless steel reflector plate 30, shown in FIGURE 2 increases the efficiency of the heater.

Figure 7:
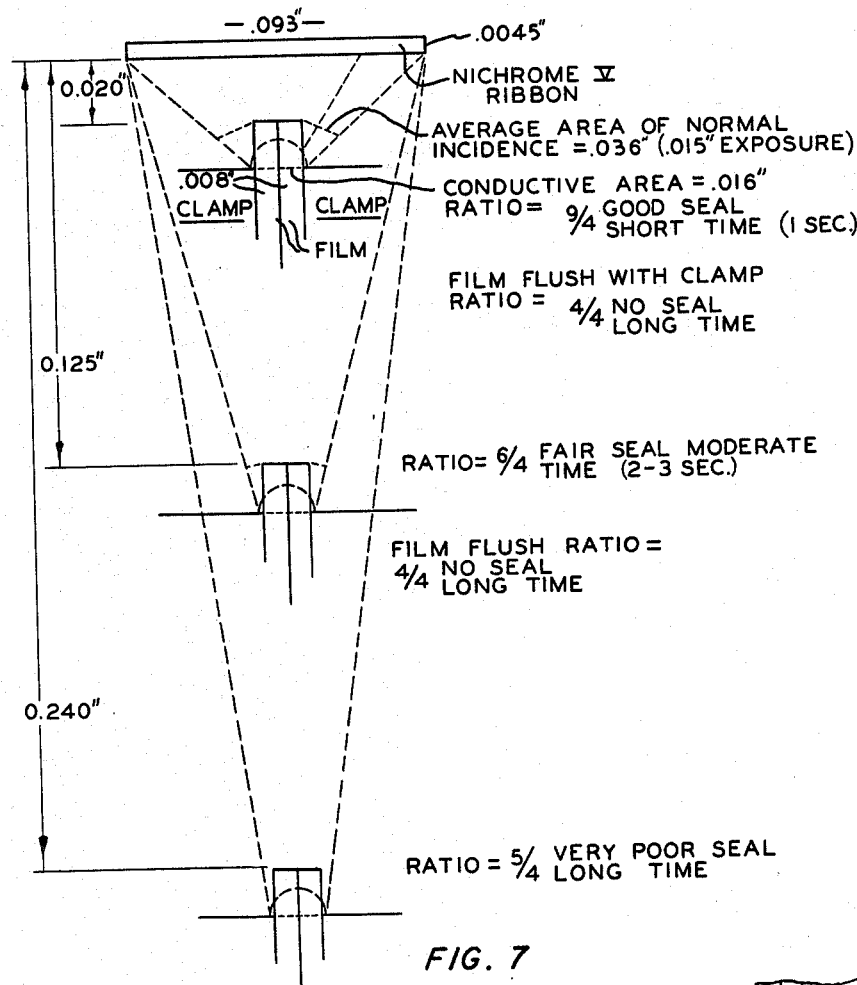
FIGURE 7 illustrates the available heating from a planar heating element.
Figure 8:
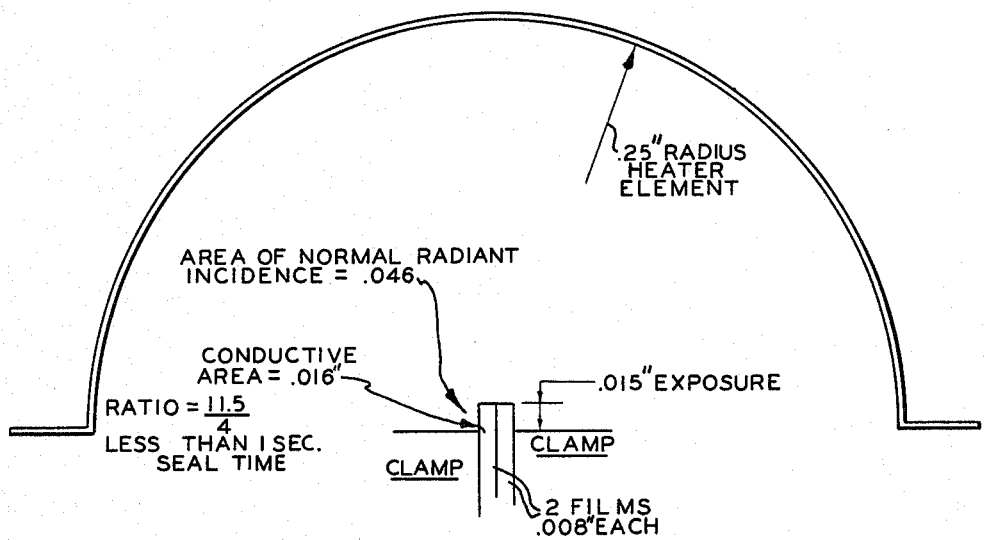
FIGURE 8 illustrates the available heating from a concave heating element having an arc of 180°.
Figure 9:
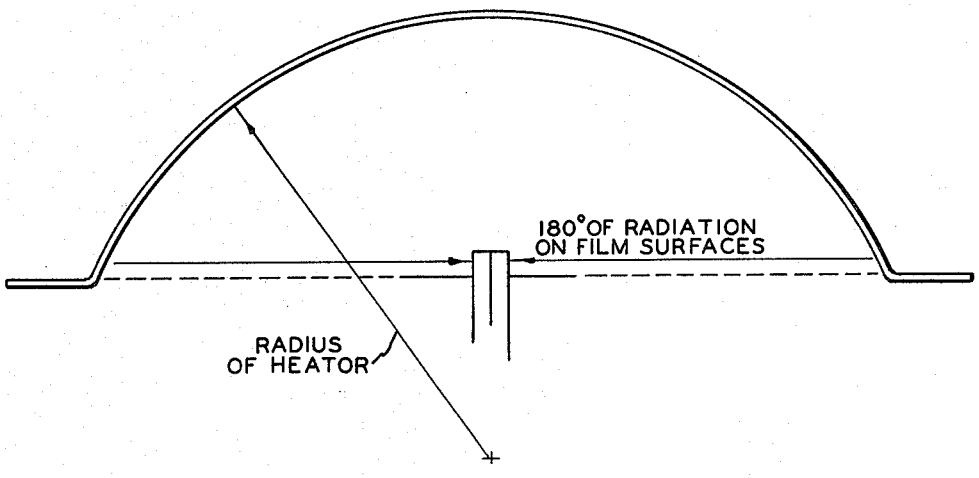
FIGURE 9 illustrates a concave heating element having an arc of 130°.

The advantages obtained by the heater of my invention can be better appreciated by reference to FIGURES 7 to 9 wherein the relative effects of a flat radiating surface and a concave surface are compared. In FIGURE 7 it can be seen that with adjacent thermoplastic film 0.088 inch in thickness projecting 0.015 inch from the clamps (corresponding to the belts 16 and 17 of FIGURE 1) a spacing of 0.020 inch from the flat radiant heating element produces a good seal in one second. The ratio of average area of normal incidence to conductive area is 9/4. As the distance between the heating element and the film edges is increased, e.g., 0.125 inch or 0.240 inch as shown in FIGURE 7, the ratio approaches unity and the sealing is adversely affected. A distance of 0.020 inch between the radiant heater and the work is not satisfactory, particularly for a commercial operation, because this small distance cannot be maintained accurately so that sticking and charring results when the film contacts the heating element, arcing occasionally occurs between the clamps and the heating element, and poor seals are obtained if the distance is increased materially.

FIGURE 8 shows that satisfactory sealing of the film edges of FIGURE 7 can be accomplished with a concave radiant heater spaced 0.250 inch from the work in less than one second. The ratio of the area of normal radiant incidence to conductive area is 11.5/4. This is the preferred relationship of radiant heater and film edge.

FIGURE 9 shows that it is possible to obtain 180° of radiant on the film edges with a concave arc of less than 180; however, FIGURE 9 also shows that the work must be placed closer to the source of radiant heat when the arc is less than 180°.

The ceramic blocks which support the concave radiant heating element can be made of fire brick, block magnesia or other solid insulating material. Alberene (soapstone) is a particularly desirable material because it is easily milled, relatively strong and is a good reflector of radiant heat as well as being a good insulation material. Resistance materials such as Nichrome are well known and any good resistance material can be utilized to fabricate the radiant heating element.

While the method and means of this invention are applicable for use with any thermoplastic material, the invention is particularly applicable for use with the solid polymers of the 1-olefins such as solid polyethylene, solid polypropylene and solid copolymers of ethylene and 1-butene.

Variations and modifications are possible within the scope of the disclosure without departing from the spirit and scope of the invention.

That which is claimed is:

1. Apparatus for thermally sealing filled bags of thermoplastic material comprising an endless conveyor belt for conveying filled bags along a predetermined path; means to operate said conveyor belt; a pair of endless belts positioned so as to grip the open tops of bags traveling on said conveyor belt and press the sides of the open tops of the bags together with the edge portions to be sealed extending beyond the belts; a radiant heating element comprising a continuous length of flat ribbon of uninsulated resistance metal folded in a series of reverse turns and elongated portions, said elongated portions being curved to form a configuration defined as a sector of a hollow right circular cylinder having an arc of about 130° to 180° wherein said elongated portions of said heating element are substantially perpendicular to the longitudinal axis of said sector of said cylinder; means to position said heating element so that the edge portions of the open ends of the bags pass within the arc of said heating element and spaced from said heating element; means to supply electrical energy to said heating element; means directly below said heating element to cool the sides of the bags which are confined by the pair of endless belts; and means to cool the bead formed by fusing the edge portions of the bag sides spaced from said heating element along said predetermined path.

2. The apparatus of claim 1 wherein the means to cool the sides of the bags are spring biased so as to press the endless belts against the sides of the bags.

3. The apparatus of claim 1 wherein the radiant heating element is supported and confined by ceramic blocks to reflect and conserve radiated heat.

4. The method of thermally sealing the adjacent edges of adjacent layers of thermoplastic film which comprises pressing said layers together in a pressure zone with the adjacent edges projecting beyond the pressure zone; subjecting the projecting edges to uniform radiant heat generated continuously over an arc of about 130 to 180° with respect to the common plane of the layers so that the projecting edges of the layers are spaced substantially equidistant from all points of the radiant heat source; maintaining the projecting edges of the layers subjected to said radiant heat for a period of time sufficient to fuse said edges and form a bead; cooling the portion of thermoplastic layers in said pressure zone during the time the projecting edges are subjected to said radiant heat; removing the layers from the influence of said radiant heat; cooling the bead formed by the radiant heat; and maintaining said layers in said pressure zone until the formed bead has cooled.

References Cited in the file of this patent

UNITED STATES PATENTS

| | | |
|---|---|---|
| 1,005,360 | Taylor | Oct. 10, 1911 |
| 1,175,433 | Goetsch | Mar. 14, 1916 |
| 2,253,946 | Waters | Aug. 26, 1941 |
| 2,553,259 | Hagedorn | May 15, 1951 |
| 2,658,552 | Grevich | Nov. 10, 1953 |
| 2,691,474 | Olson | Oct. 12, 1954 |
| 2,749,424 | Dieterich | June 5, 1956 |